3,180,849
STABILIZATION OF POLYAMIDES WITH PHENYL HALOPHOSPHINES

Leldon M. Thompson, Decatur, Ala., assignor, by mesne assignments, to Monsanto Company, a corporation of Delaware
No Drawing. Filed June 29, 1961, Ser. No. 120,511
18 Claims. (Cl. 260—45.7)

This invention relates to a process for the production of synthetic linear polyamides having improved properties and more particularly to a process for the production of synthetic linear polyamides which are stabilized against changes in viscosity, molecular weight, breaking strength and elongation usually caused by exposure to oxygen, heat and light.

High molecular weight synthetic linear polyamides generically referred to as "nylon" and having particular use for the preparation of synthetic fibers and other shaped articles are well known. These polyamides are generally defined as being characterized by a molecular weight greater than 10,000 and a crystalline structure which may be oriented by cold drawing filaments thereof to improve their tensile strength and pliability, or by extrusion to form superior molding, wire compositions and the like.

In the preparation of textile products and other shaped articles from nylon a certain amount of exposure to heat and light often seriously affects the breaking strength and elongation of fibers and the color of certain finished articles prepared from nylon. In order to improve the resistance of nylon to heat and light degradation, various stabilizing agents have been employed in the past to stabilize polyamides so that they remain unchanged on exposure to heat and light or other conditions which would bring about undesirable changes in their properties.

Accordingly, it is an object of the invention to stabilize polyamides against light and heat degradation. Another object of the invention is to provide a new stabilizer for polyamides. It is another object of the invention to provide a process for the preparation of stabilized polyamides of high molecular weight, and of filaments, fibers, films, and other shaped articles therefrom. Other objects will appear hereinafter.

These and other objects are accomplished by adding to the polyamide forming raw materials before condensation, to the reaction mass during condensation or to the hot polymer melt small quantities of a phenyl halophosphine compound.

The polyamides which are useful in the practice of the present invention are of the general types described in U.S. Patents 2,071,250, 2,071,253 and 2,130,948. Accordingly, throughout the instant specification and claims, the terms "synthetic linear polyamides" and "polyamides" designate the general types described in said patents.

A characteristic property of these polyamides is that they can be formed into filaments which can be cold drawn into fibers showing molecular orientation along the fiber axis. Polyamides are particularly useful for the preparation of fibers, films, bristles, sheets, rods, tubes, and the like. Polyamides are of two types, those obtainable from polymerizable monoamino-monocarboxylic acids and their amide-forming derivatives, for example, caprolactam, and those obtainable from the reaction of suitable diamines and suitable dicarboxylic acids or amide-forming derivatives of dibasic dicarboxylic acids. In these polyamides the amide group forms an integral part of the main chain of atoms in the polymer. On hydrolysis with strong mineral acids, the polyamides revert to monomeric polyamide-forming reactants. Polyamides may, also, be defined as long-chain synthetic polymeric carbonamides which have recurring carbonamide groups as an integral part of the main polymer chain and which are capable of being formed into a filament.

The phenyl halophosphine compounds suitable in the practice of this invention include phenyl dichlorophosphine, phenyl dibromophosphine, phenyl diiodophosphine, diphenyl bromophosphine and diphenyl chlorophosphine. The amount of these compounds which may be added in accordance with the present invention will vary according to the type of polyamide to be prepared and the molecular weight desired in the ultimate polymer. From 0.05 to 5 percent of the phenyl halophosphine compounds of this invention may successfully be employed, preferably from 0.05 to 2 percent by weight. In all cases one skilled in the art can easily determine the exact amount of phenyl halophosphine compound necessary to achieve proper stabilization by simple experiment.

The phenyl halophosphines of this invention are preferably added to polyamides at any convenient point prior to the completion of the polymerization reaction. By so doing, the stabilizer is incorporated into the polymer itself rather than just on the surface. This results in a much longer lasting stabilization effect than would be possible with a mere surface coating since there is less possibility of the stabilizer being reduced in its effectiveness by further treatments in finish baths and the like. The addition may take place during the preparation of the nylon salt solution, that is during the mixing of the polyamide forming materials. The phenyl halophosphines of this invention may, also, be added to the reaction mass during condensation along with delustrants and other additives or to the polymer melt prior to extrusion.

The polymerization may be carried out continuously, batch-wise or in separate stages. Regardless of the polymerization method employed the stabilizing agent is properly incorporated into the final polymerization product. The invention includes filaments, films and other shaped articles made from the polyamides of the invention. For example, the polyamides may be melt spun or wet spun into filaments and other shaped articles all of which exhibit the heat and light stability contemplated by the invention.

The invention is further illustrated by the following example in which all parts and percents are by weight unless otherwise indicated.

EXAMPLE I

A nylon salt solution of approximately equimolar proportions of hexamethylene diamine and adipic acid was prepared. 0.1 weight percent of phenyl dichlorophosphine was added to the solution, a fiber was produced and the results tabulated below. The light exposure results were based on 100 SFH (Standard Fade-O-Meter hours) in an Atlas Fade-O-Meter by the methods recommended by the Technical Manual of the American Association of Textile Chemists and Colorists, Howes Publishing Co., 44 E. 23rd Street, New York city (1957). Heat measurements were based on 8 hours exposure to 200° C. in a hot air oven.

*Table I*

| Additive | Percent Retained After 100 SFH | | Percent Retained After 8 hours at 200° C. | |
|---|---|---|---|---|
| | Ten. | Elong. | Ten. | Elong. |
| Control | 33 | 27 | 35 | 20 |
| Phenyl Dichlorophosphine | 69 | 52 | 56 | 31 |

This example indicates the improved heat and light stability of nylon obtained when using the stabilizer of this invention, tenacity on exposure to light being improved 100 percent.

As many variations of this invention may be made without departing from the spirit and scope thereof, it is to be understood that the same is to be limited solely by the scope of the appended claims.

I claim:

1. A new composition of matter comprising a synthetic linear polyamide and from 0.5 to 5 percent by weight of a phenyl halophosphine, said polyamide being a long chain synthetic polymeric carbonamide which has recurring carbonamide groups as an integral part of the main polymer chain and which is capable of being formed into a filament by orientation along the fiber axis.

2. A substantially color stable linear polyamide comprising the reaction product of polyamide forming reactants, with a light and heat stabilizing agent comprising a phenyl halophosphine, said agent being used in an amount ranging from 0.05 to 2 percent by weight.

3. The composition of claim 1 wherein the phenyl halophosphine is phenyl dichlorophosphine.

4. The composition of claim 1 wherein the phenyl halophosphine is diphenyl chlorophosphine.

5. The composition of claim 1 wherein the phenyl halophosphine is phenyl dibromophosphine.

6. The composition of claim 1 wherein the polyamide is polyhexamethylene adipamide.

7. The composition of claim 1 wherein the polyamide is polycaprolactam.

8. A process for preparing a synthetic linear polyamide stabilized against changes caused by exposure to heat, light, moisture and oxygen comprising condensing a diamine containing at least one hydrogen atom directly attached to each nitrogen atom with a dicarboxylic acid, said condensation being effected in the presence of from 0.5 to 2.0 percent by weight of a phenyl halophosphine.

9. The process defined in claim 8 wherein said polyamide is an approximately equimolar mixture of hexamethylene diamine and adipic acid.

10. The process defined in claim 8 wherein 0.1 percent by weight of the phenyl halophosphine is employed.

11. The process defined in claim 8 wherein the phenyl halophosphine is phenyl dichlorophosphine.

12. The process defined in claim 8 wherein the phenyl halophosphine is diphenyl chlorophosphine.

13. The process defined in claim 8 wherein the phenyl halophosphine is phenyl dibromophosphine.

14. A process for preparing synthetic linear polyamides of improved stability towards heat and light, comprising heating a polyamide forming composition in the presence of 0.05 to 2 percent by weight of a phenyl halophosphine, at polymerization temperatures until the product exhibits fiber-forming qualities.

15. The process defined in claim 14 wherein the polyamide is polyhexamethylene adipamide.

16. The process defined in claim 14 wherein the phenyl halophosphine is phenyl dichlorophosphine.

17. The process defined in claim 14 wherein the phenyl halophosphine is diphenyl chlorophosphine.

18. The process defined in claim 14 wherein the phenyl halophosphine is phenyl dibromophosphine.

References Cited by the Examiner

Kosolapoff: "Organophosphorus Compounds," Wiley and Sons, New York, 1950, Chapter 3, pages 42–53.

LEON J. BERCOVITZ, *Primary Examiner.*

MILTON STERMAN, *Examiner.*